O. E. PEASE.
VEHICLE TOP.
APPLICATION FILED APR. 27, 1915.
1,173,380.
Patented Feb. 29, 1916.
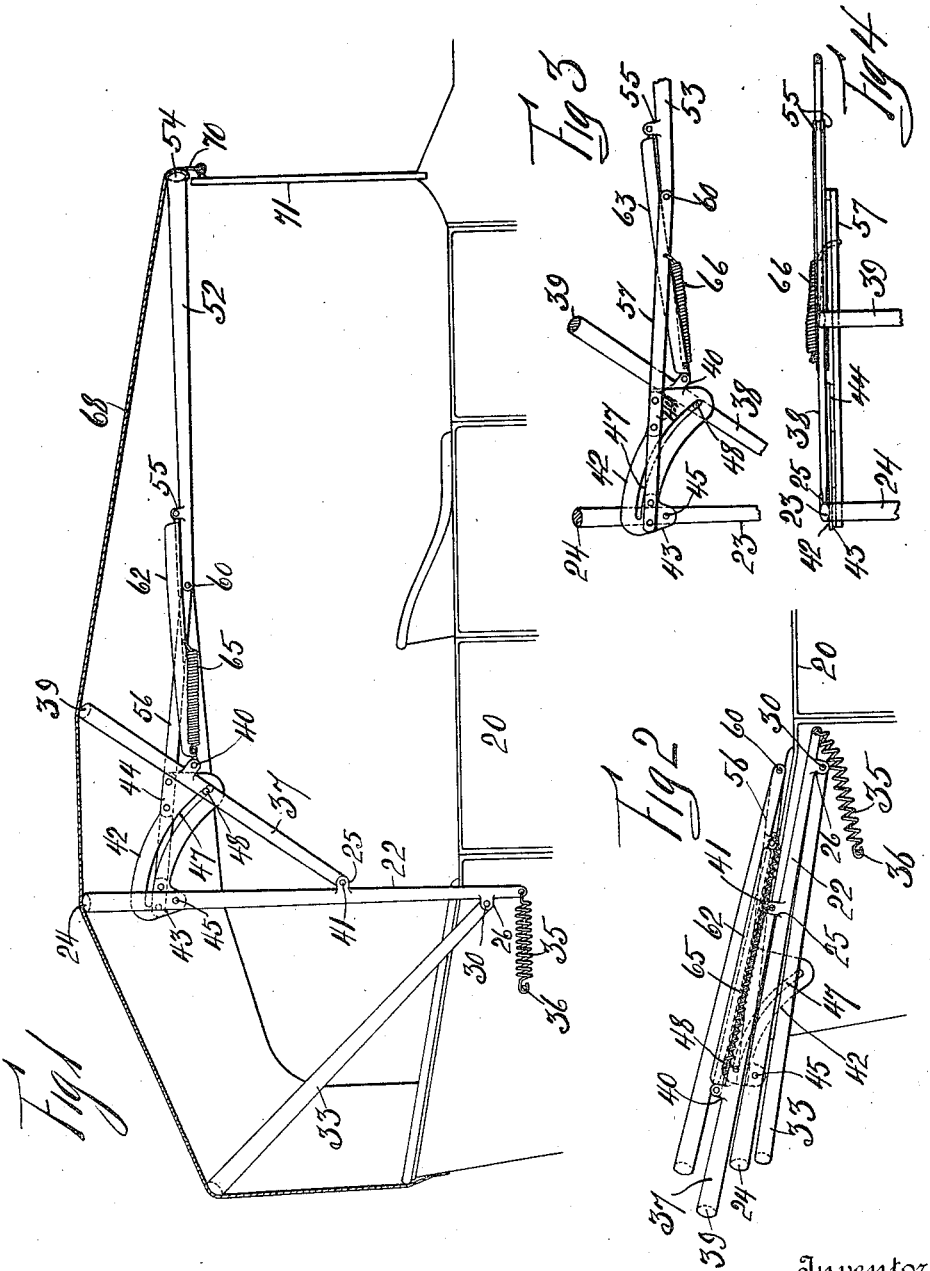
Witnesses:
John Jessich
C. A. Case
Inventor
Orville E. Pease
By his Attorney
A. A. de Bonneville

UNITED STATES PATENT OFFICE.

ORVILLE E. PEASE, OF BALDWIN, NEW YORK, ASSIGNOR TO CARL JOSEPH, OF BAYONNE, NEW JERSEY.

VEHICLE-TOP.

1,173,380.  Specification of Letters Patent. Patented Feb. 29, 1916.

Application filed April 27, 1915. Serial No. 24,191.

*To all whom it may concern:*

Be it known that I, ORVILLE E. PEASE, a citizen of the United States, and a resident of Baldwin, in the county of Nassau and State of New York, have invented certain new and useful Improvements in Vehicle-Tops, of which the following is a specification.

This invention relates to a vehicle top.
Its organization comprises a number of bows for a canopy or cover. A guide bracket is pivoted to a main bow to control the movements of an intermediate bow and an out rigger bow, so that the bows are properly positioned when the vehicle top is open and also when it is closed.

In the drawings Figure 1 shows a side elevation of the vehicle top when in its open position, with a fragmentary portion of a vehicle; Fig. 2 represents a side view of the elements shown in Fig. 1 when in a closed position; Fig. 3 shows an elevation of some details and Fig. 4 is a top plan view of Fig. 3.
The body of a vehicle is indicated at 20. A main bow comprises the side members 22, 23 with the top connecting portion 24. Lugs 25, 26 are formed with each of the side members 22 and 23. Pivots 30 extend from the body 20 of the vehicle and engage openings in the lugs 26. A rear bow 33 has openings formed in the lower ends of its side members which engage the pivots 30. A spring 35 on each side of the body 20 has one end thereof connected to a pin 36 extending from said body while the other ends of the springs are fastened respectively to the lower ends of the members 22 and 23. An intermediate bow comprises the side members 37 and 38 with the connecting portion 39. Lugs 40 extend from the side members 37 and 38, and the lower ends of the said side members are pivoted to the lugs 25 by means of pins 41. Guide brackets 42 with projecting pads 43, 44 are pivoted by means of the pins 45 to the side members 22, 23. Each guide bracket 42 has formed therewith a guide slot 47. A pin 48 extends from each of the side members 37, 38 of the intermediate bow and engages the guide slot 47. An outrigger bow comprises the side members 52, 53 with the connecting portion 54. Lugs 55 are formed with the side members 52, 53. Braces 56, 57 at one end are fastened to the guide brackets 42, and the other ends thereof are pinned to the side members 52 and 53 by means of the pins 60. Channel links 62, 63, have each one end pivoted to the lugs 40 and the other ends of said links are pivoted to the lugs 55. Springs 65, 66 connect the channel links 62, 63 with the braces 56, 57 respectively. A cover or canopy 68 is supported on the bows of the vehicle top and fastened thereto. A strap 70 connects the outer end of the out-rigger bow with the frame of the wind shield 71. To open the vehicle top, the operator slightly raises the out-rigger bow having the connecting portion 54 and the springs 35 force the main bow having the connecting portion 24 to its upright position and the springs 65 force the out-rigger bow with the connecting portion 54 to its forward position.

All the springs described may be omitted and top opened easily by hand.

Having described my invention what I desire to secure by Letters Patent and claim is:

1. In a vehicle top of the character described the combination of a main bow, an intermediate bow with the lower ends thereof pivoted to the side members of the main bow, guide brackets each having a slot pivoted to the side members of the main bow, pins on the intermediate bow engaging said slot, braces with one of their ends fastened to the said guide brackets, an out-rigger bow pivoted to the other ends of said braces, and links connecting the out-rigger bow and the intermediate bow.

2. In a vehicle top of the character described the combination of a main bow, an intermediate bow with the lower ends thereof pivoted to the side members of the main bow, guide brackets each having a slot pivoted to the side members of the main bow, pins on the intermediate bow engaging said slot, braces with one of their ends fastened to the said guide brackets, an out-rigger bow pivoted to the other ends of said braces, links connecting the out-rigger bow and the intermediate bow, a rear bow pivoted to the main bow, and a cover for all the bows.

3. In a vehicle top of the character described the combination of a main bow, springs connecting the lower ends of the side members of the main bow with the body of a vehicle, an intermediate bow with the lower ends thereof pivoted to the side members of the main bow, guide brackets each having a slot pivoted to the side members of the main bow, pins on the intermediate bow engaging said slot, braces with one of their ends fastened to the said guide brackets, an out-rigger bow pivoted to the other ends of said braces, links connecting the out-rigger bows and the intermediate bows and springs connecting said links and braces.

Signed at the borough of Manhattan, in the county of New York and State of New York, this 23d day of April A. D. 1915.

ORVILLE E. PEASE.

Witnesses:
A. A. DE BONNEVILLE,
JOHN JESSICH.